US010750616B2

(12) United States Patent
Christo et al.

(10) Patent No.: US 10,750,616 B2
(45) Date of Patent: Aug. 18, 2020

(54) CONTROLLED-IMPEDANCE PRINTED-CIRCUIT BOARD (PCB) DESIGN WITH STACK-UP RE-MAPPING

(71) Applicant: INTERNATIONAL BUSINESS MACHINES CORPORATION, Armonk, NY (US)

(72) Inventors: Michael A. Christo, Round Rock, TX (US); Diana D. Zurovetz, Round Rock, TX (US); David Green, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/102,801

(22) Filed: Aug. 14, 2018

(65) Prior Publication Data

US 2020/0060026 A1    Feb. 20, 2020

(51) Int. Cl.
G06F 30/394 (2020.01)
H05K 3/00 (2006.01)
G06F 30/398 (2020.01)

(52) U.S. Cl.
CPC ......... *H05K 3/0005* (2013.01); *G06F 30/394* (2020.01); *G06F 30/398* (2020.01)

(58) Field of Classification Search
USPC ....................................................... 716/126
See application file for complete search history.

(56) References Cited

U.S. PATENT DOCUMENTS

| 7,240,319 | B2 | 7/2007 | Bentley et al. |
| 7,870,527 | B2 | 1/2011 | Tsai |
| 8,255,844 | B2 | 8/2012 | Kato et al. |
| 8,438,524 | B1 | 5/2013 | Kohli et al. |
| 8,667,444 | B2 | 3/2014 | Henrickson et al. |
| 9,087,164 | B2 | 7/2015 | Perry et al. |
| 9,372,950 | B2 | 6/2016 | Mai et al. |
| 9,881,120 | B1 | 1/2018 | Ginetti et al. |
| 2009/0125861 | A1* | 5/2009 | Orita ................... G06F 17/5077 716/137 |
| 2012/0240093 | A1* | 9/2012 | Alpert ................. G06F 17/5031 716/129 |

(Continued)

OTHER PUBLICATIONS

Church, et al., "Printer Circuit Structures, the Evolution of Printed Circuit Boards", IPC APEX EXPO Conference Proceedings, 2013, 11 pages (pp. 1-11 in pdf), US.

*Primary Examiner* — Eric D Lee
(74) *Attorney, Agent, or Firm* — Peter J. Edwards

(57) ABSTRACT

A controlled-impedance printed circuit board (PCB) design program allows interactive movement of features from one of the vertically-stacked layers of the design to another layer in a graphical interface. The movement either moves a region of a layer of the PCB design, or moves an entire layer in a layer-swapping operation. The program computes modified widths of circuit traces of the first layer of the controlled-impedance printed circuit board design according to an impedance control value of the controlled-impedance printed circuit board design and according to a new position of the circuit traces caused by a movement of the features of the first layer to the second layer. The program also checks for violation of reference plane requirements for critical signals and warns the designer if such a violation is present.

18 Claims, 7 Drawing Sheets

(56) References Cited

U.S. PATENT DOCUMENTS

2015/0113493 A1* 4/2015 Lin .................... G06F 17/5077
  716/120
2016/0012172 A1* 1/2016 Folberth ............. G06F 17/5077
  716/113

* cited by examiner

CONTROLLED-IMPEDANCE PRINTED-CIRCUIT BOARD (PCB) DESIGN WITH STACK-UP RE-MAPPING

BACKGROUND OF THE INVENTION

1. Field of the Invention

The present invention is related to printed circuit board (PCB) design programs, and more specifically to PCB design programs, methods and systems that provide a user-interactive ability to relocate a portion of a controlled-impedance PCB stack.

2. Description of Related Art

In present high-speed microelectronic circuits, controlled-impedance designs are used for signal management within printed circuit boards (PCBs), multi-chip module (MCMs) substrates and other package substrates. With the high frequencies and/or narrow pulse widths of critical signals in present-day digital circuits as well as in high-frequency analog circuits, special layout techniques including controlled signal-line impedances are typically required for routing critical signal paths to minimize reflections, impedance mismatches and coupling between signal paths, according to electromagnetic analysis techniques. Signal return paths, which may be reference planes such as power planes or dedicated signal reference planes are typically provided between signal layers to provide controlled signal path impedance and to shield overlapping signal paths from each other.

Since design of such high speed/frequency PCBs requires careful attention to impedance and layout, the designs are typically entered by the designer manually using a graphical interface of a PCB design program, and design rules are checked for conformance after the design is complete and run through a design rules check (DRC), after which the designer makes alterations to the design to correct design rule violations. If changes are made to a design, such as swapping layers of the design or moving critical signals, i.e., those signals subject to controlled-impedance design rules, the designer typically has to make adjustments to the circuit features manually in order to pass a successful DRC. In particular, when circuit and reference layers may be separated by multiple substrate materials that differ, the individual layer heights also differ, making it necessary to re-design the circuit layers completely with each of such changes.

It is therefore desirable to provide a PCB design program methodology, computer program and system that maintain proper impedance levels and reference returns for critical signal paths. It is also desirable to provide such a design program methodology and computer program that allow a printed circuit board designer as user of the program to easily relocate features during a PCB design layout process. It is further desirable to provide such a design program methodology and computer program that enforce proper reference returns for critical signal paths.

BRIEF SUMMARY OF THE INVENTION

The invention is embodied in a method, computer system and computer program product that perform PCB design operations. The computer system is a computer system executing program instructions for carrying out the method and the computer program product is a program for carrying out the method.

The method is a computer-performed method of interacting with a printed circuit board designer using a workstation computer system modifying a controlled-impedance printed circuit board design comprising a plurality of vertically-stacked layers. The computer-performed method comprises loading the controlled-impedance PCB design and editing the PCB design by a user input directing modification of the PCB design by moving features of a first one of the plurality of vertically-stacked layers of the controlled-impedance printed circuit board design to a second one of the plurality of vertically-stacked layers. The movement either moves a region of a layer of the PCB design, or moves an entire layer in a layer-swapping operation. The workstation computer system displays a first graphical representation of the PCB design and provides the ability to interactively edit the PCB design. In response to receiving user input, the workstation computer system computes modified widths of circuit traces of the first layer of the controlled-impedance printed circuit board design according to an impedance control value of the controlled-impedance printed circuit board design and according to a new position of the circuit traces caused by a movement of the features of the first layer to the second layer. The workstation computer system then stores the modified widths of the circuit traces in a representation of the second layer of the controlled-impedance printed circuit board design. The workstation computer then generates and displays a modified graphical representation of the controlled-impedance circuit board design according to the movement of the features of the first one of the plurality of vertically-stacked layers to the second one of the plurality of vertically-stacked layers.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

This disclosure presents novel techniques that facilitate design and design modification of impedance-controlled PCB layouts, in particular those PCBs that include traces bearing critical signals, i.e., signals having high frequency components for which microstrip and/or stripline treatment is required in order to minimize reflections, radiation/reception of electrical interference and other signal changes due to impedance mismatches. Conventional controlled-impedance design programs require the PCB designer to repeat the layout process, or modify each element of a layout when making a large-scale change. Such large-scale changes include swapping layers in a PCB stack-up or changing impedance parameters and physical characteristic such as dielectric type, layer thickness or another global change that affects the circuit impedances on a layer. The present disclosure provides embodiments that automatically adjust the trace widths in both the database of circuit elements and the graphical circuit layout representation to permit the PCB designer to interactively change the design in such a manner. The present disclosure also provides embodiments that permit the PCB designer to move an entire region of the circuit from one layer to another, while automatically adjusting the database of circuit elements and the graphical representation, where conventionally a PCB designer would need to re-design that portion of the circuit. The resulting operation improves PCB design efficiency and speed, as changes can be made more quickly on-the-fly during the design process, rather than requiring iteration between circuit adjustments and design rule checking.

Figure 1A:
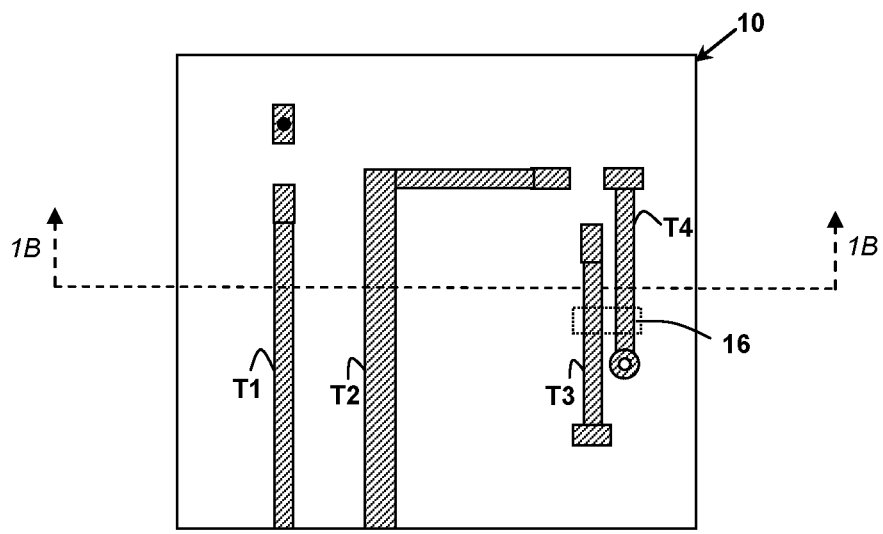
FIGS. 1A-1C are pictorial diagrams depicting a graphical user interface directed to modify a controlled-impedance PCB design as may be performed within the example PCB design program in accordance with an embodiment of the disclosure.

Referring to FIG. 1A, a top view of an example portion of a PCB design 10 is illustrated, as may be displayed within a graphical user interface (GUI) of a PCB design program in accordance with an embodiment of the disclosure, including an example error box 16 as may be shown according to the following examples. Since design issues according to the illustrated embodiment are more readily exemplified by the side views illustrated below, it is understood that the GUI viewed by the PCB designer is generally a top or bottom view rather than a side view, as the circuit layout is most visible. Therefore, for the following examples in which an error box 16 is shown in the side view, it is understood that the error box is further displayed in a top view to show the PCB designer a location of the error in the top view.

Figure 1B:
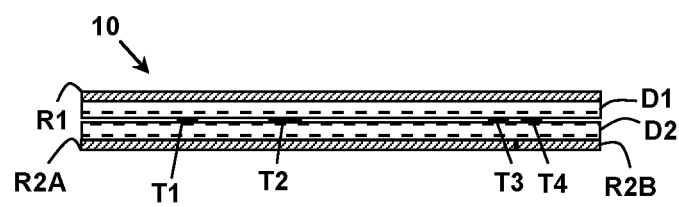

Referring further to FIG. 1B a side cross-section view of the PCB design 10 is shown, which includes a stack-up formed by two insulating dielectric layers D1, D2, a reference layer R1 and a split reference layer having reference layer portions R2A and R2B. A signal trace layer includes signal traces T1-T4. For the configuration shown, critical signals that may be carried by one or more of signal traces T1-T4 require treatment as a "stripline" design, as signal traces T1-T4 are sandwiched between two reference planes R1 and the reference plan formed by reference layer portions R2A/R2B. Such a design is referred to as a controlled-impedance design because signal traces T1-T4 form a TEM (transverse electric-magnetic) transmission line within reference planes R1 and R2A/R2B and have a characteristic impedance resulting therefrom. In addition, treatment of one or more of signal traces T1-T4 forming transmission lines require consistency of reference planes R1 and R2A/R2B and reduction or removal of discontinuities, including stubs that extend either horizontally within the associated circuit layer or vertically by vias that interconnect traces and/or reference planes.

Figure 1C:
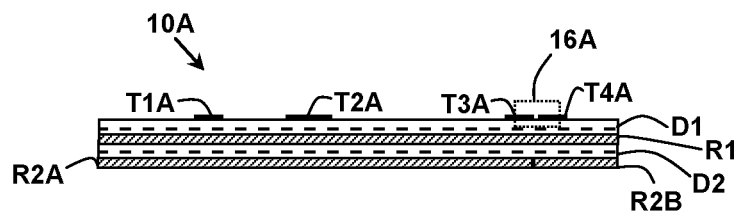

Referring to FIG. 1C, the PCB designer has interchanged reference layer R1 with the signal trace layer containing signal traces T1-T4, resulting in a PCB design 10A by clicking to select reference layer R1 and the layer containing signal traces T1-T4 sequentially, then executing a swap command via keyboard or clicking an icon, selecting a menu item, etc. Signal traces T1-T4 now require treatment as a microstrip structure since they are no longer surrounded by two reference planes, and therefore would have a different characteristic impedance. However, in response to the swap operation, the widths of signal traces T1A-T4A have been increased in order to maintain a characteristic impedance specified for signal traces T1-T4. While the illustrations show adjustment of all of signal traces T1A-T4A for simplicity of illustration, in practice, only signals specifically designated as critical signals will have their corresponding signal traces adjusted, and widths of traces bearing other non-critical signals would remain constant. Another feature of the program according to the illustrated embodiment of the disclosure is instant error notification. An error box 16A has been generated in the graphical display of the PCB design that warns the PCB designer and associated text is displayed (not shown) either alongside error box 16A, at the bottom of the screen when error box 16A is hovered-over or otherwise highlighted, or another suitable location for explaining the reason for the violation, which in the instant case is that the distance between signal traces T3A and T4A has decreased to a value that is less than a minimum specified inter-trace distance.

Figure 2A:
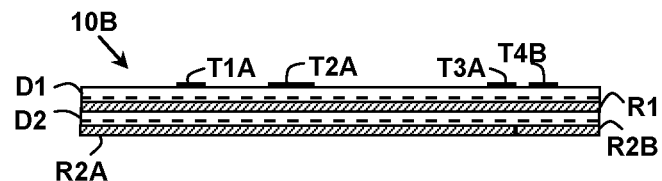
FIG. 2A-2C are pictorial diagrams depicting the graphical user interface directing another modification of a controlled-impedance PCB design as may be performed within the example PCB design program in accordance with an embodiment of the disclosure.
Figure 2B:
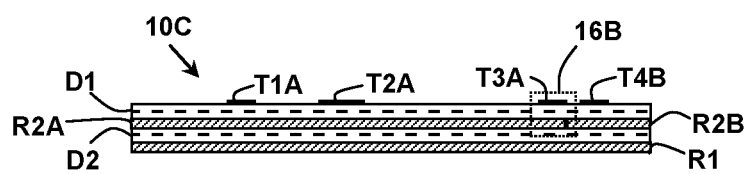
Figure 2C:
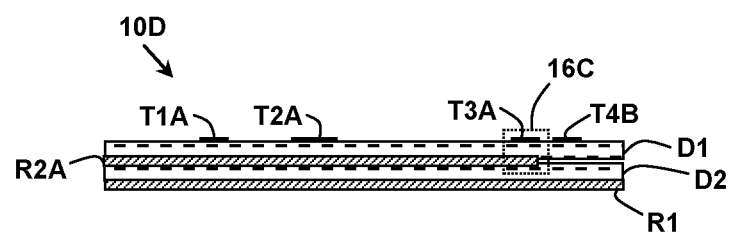

Referring now to FIG. 2A, an adjustment made by the PCB designer to correct the above-noted violation in PCB design 10A as illustrated, in which a signal trace T4B has been moved toward the right edge in next PCB design 10B. Next, as shown in FIG. 2B, the PCB designer has interchanged reference layer R1 and the layer containing reference layer portions R2A, R2B to form PCB design 10C. Another error box 16B has been generated, with associated text (not shown) that describes a violation due to signal trace T3A now extending over reference layer portion R2B, since reference layer portion R2B is not a reference plane associated with the signal carried by signal trace T3A. FIG. 2C illustrates an attempt by the PCB designer to correct the violation indicated by error box 16B in PCB design 10C by removing reference layer portion R2B in next PCB design 10D, but another error box 16C is generated with associated text (not shown) that indicates that signal trace T3A is not completely covered by a reference plane, which can be corrected by either moving signal trace T3A or by extending reference layer portion R2A underneath signal trace T3A.

Figure 3:
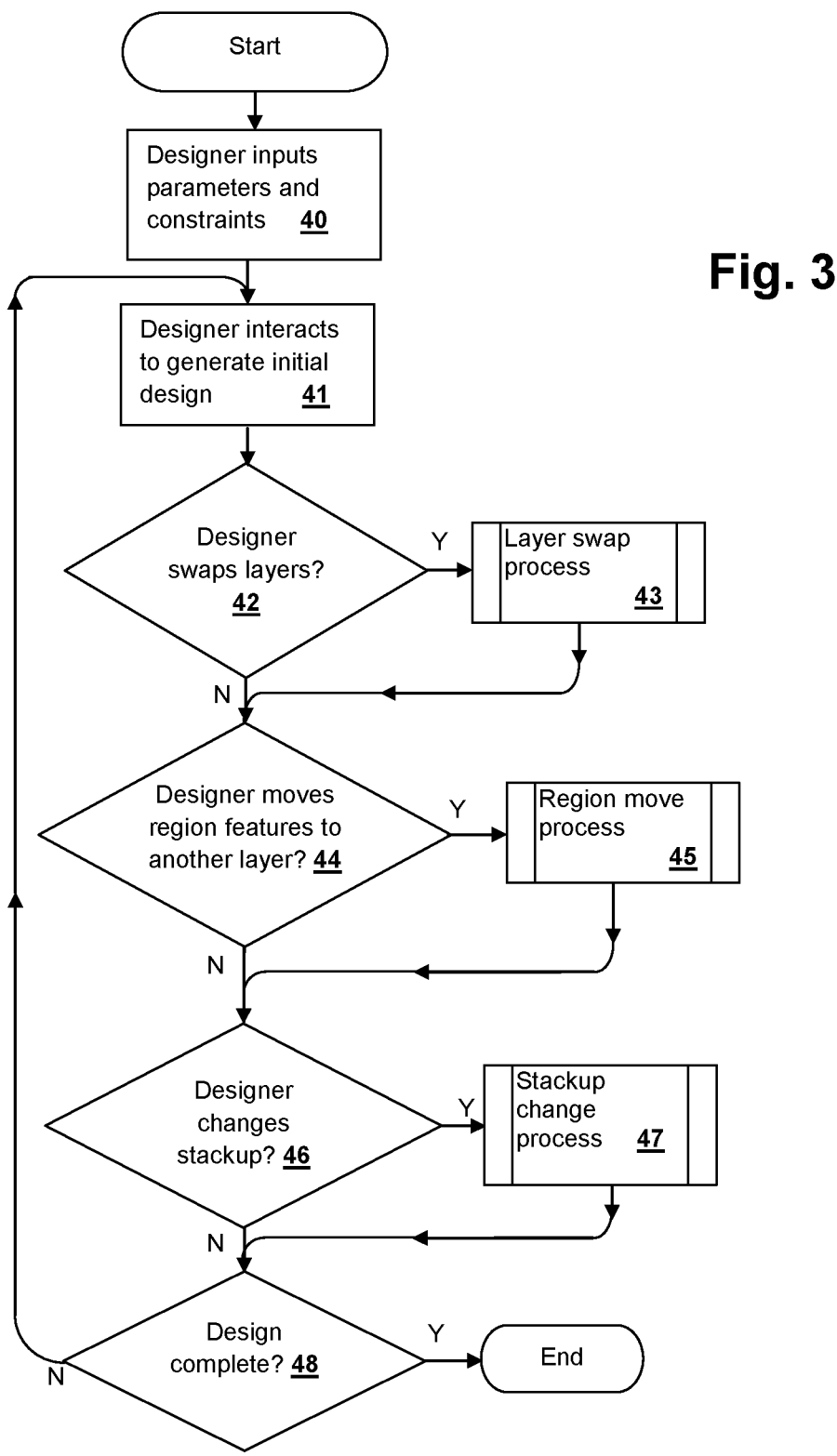
FIG. 3 is a flow chart depicting a method in accordance with an embodiment of the disclosure.

Referring now to FIG. 3, a flow chart illustrates a method of operation of the above-described PCB design process in accordance with an embodiment of the disclosure. First the PCB designer inputs parameters for the PCB design (step 40), such as the characteristic impedance for any critical signals, indication of the critical signals, and constraints such as the minimum inter-trace distance, maximum stub length and other constraints that must be met for a suitable PCB design. Alternatively, any or all of the parameters and constraints may be provided from previously saved configurations and/or received from other software such as a circuit modeling program. Next, the PCB designer interacts with the GUI to produce a layout for the initial design of the PCB (step 41). If the PCB designer directs a layer swap as described above (decision 42), then a layer swap process is invoked (step 43). If the PCB designer moves a region of features from one layer to another (decision 44), then a region move process is invoked (step 45). If the designer changes the stack-up (decision 46), then a stack-up change process is invoked (step 47). Until the design is complete (decision 48), the PCB designer is afforded the option to perform any of the above-described operations or make other design changes. While not explicitly illustrated above, a region move process operates similar to the swapping operations that are illustrated, just that only features within a specified region are moved, i.e., by drawing a selection rectangle around the features and invoking a move command. The stack-up change alters one or more design parameters for the PCB such as thickness of one or more layers, dielectric constant of the target PCB material, and similar parameters.

Figure 4:
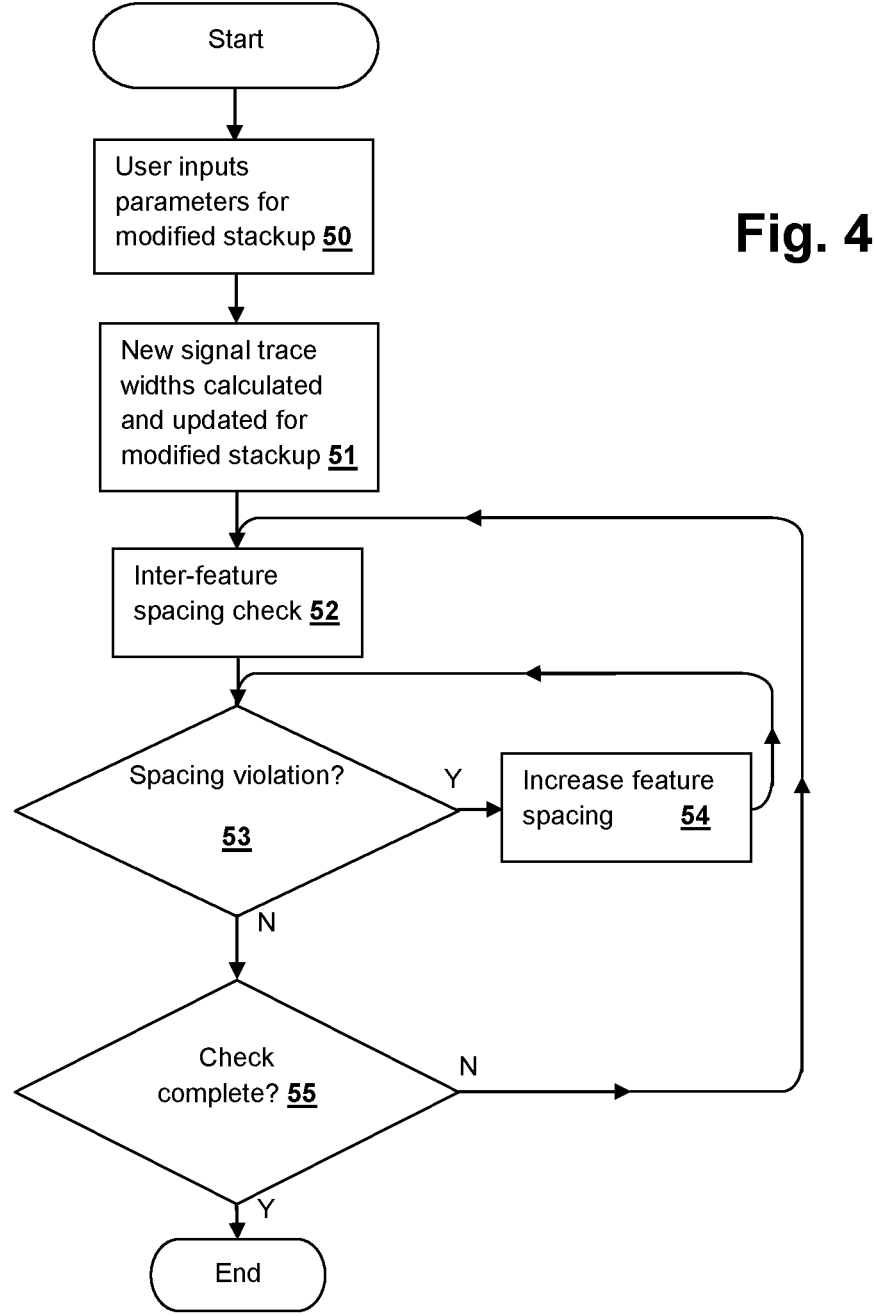
FIG. 4 is a flow chart depicting a further process within the method of FIG. 3.

Referring now to FIG. 4, the stack-up change process invoked in step 47 of FIG. 3 is illustrated in accordance with an example embodiment. First the user enters the parameters for the modified stack-up (step 50) and new signal trace widths are computed according to the specified characteristic impedance(s) for the traces bearing critical signals (step 51). An inter-feature spacing check is performed (step 52) and if any spacing violations occur (decision 53) then the feature spacing is increased (step 54) by moving a feature. Once the inter-feature spacing check is complete (decision 55), the process returns to decision 48 of FIG. 3.

Figure 5:
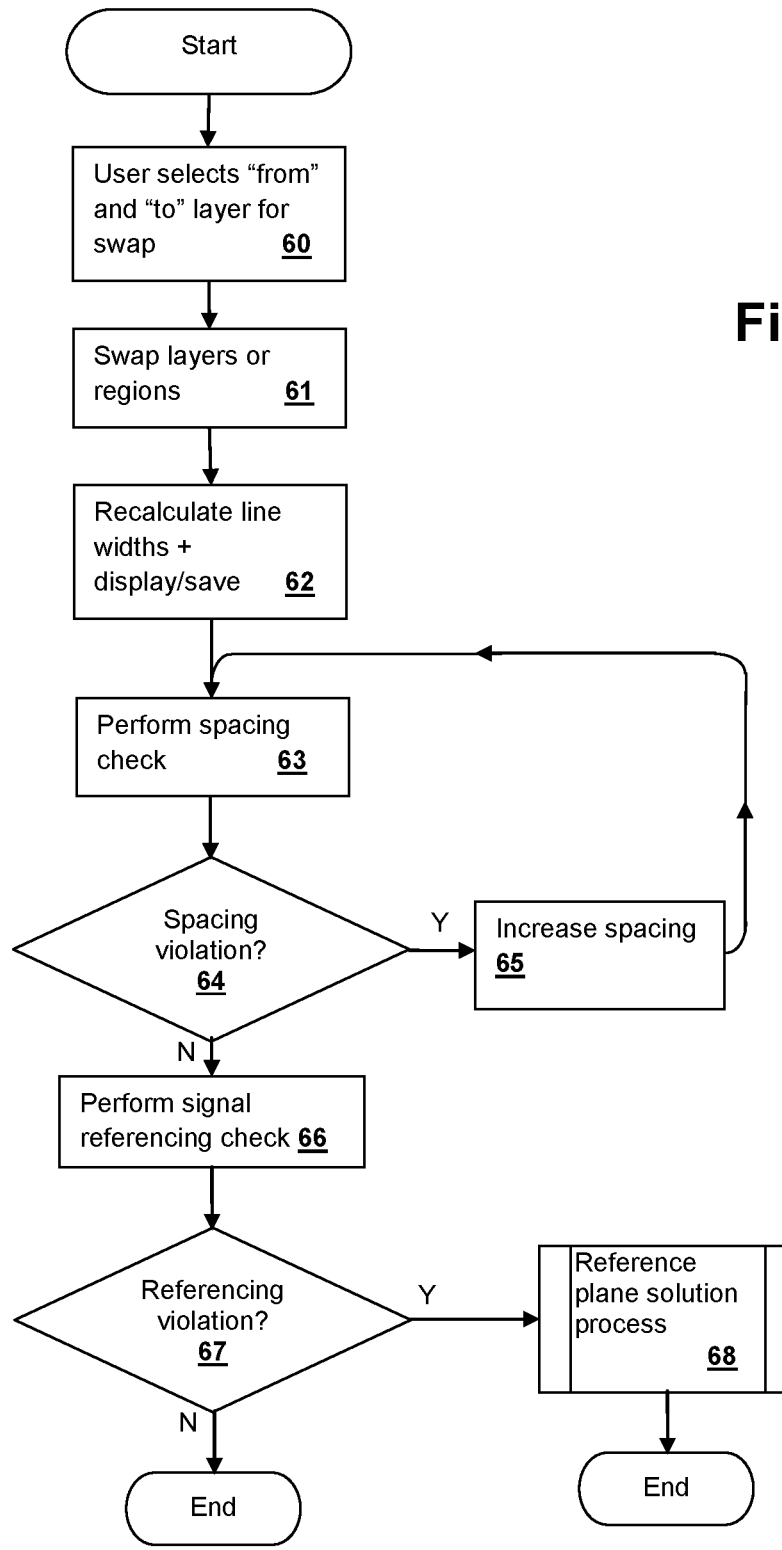
FIG. 5 is a flow chart depicting a further process within the method of FIG. 3.

Referring now to FIG. 5, the region move/layer swap processes invoked in steps 43 and 45 of FIG. 3 are illustrated in accordance with an example embodiment that is used for both region moving and layer swapping. First the user selects the "from" and "to" layers to swap (step 60) and the layers or region on the layers are swapped (step 61). New signal trace widths are computed or are adjusted based on a user-defined impedance definition for the signal trace layer, saved and displayed according to the specified characteristic impedance(s) for the traces bearing critical signals (step 62). An inter-feature spacing check is performed (step 63) and if any spacing violations occur (decision 64) then the feature spacing is increased (step 65) by moving a feature. Once the inter-feature spacing check is complete (decision 64), signal referencing is checked (step 66) to ensure that the signal traces are proximate to a correct reference plane. If a referencing violation is present (decision 67) then a reference plane solution process is invoked (step 68), otherwise the process returns to decision 44 or decision 46 of FIG. 3.

Figure 6:
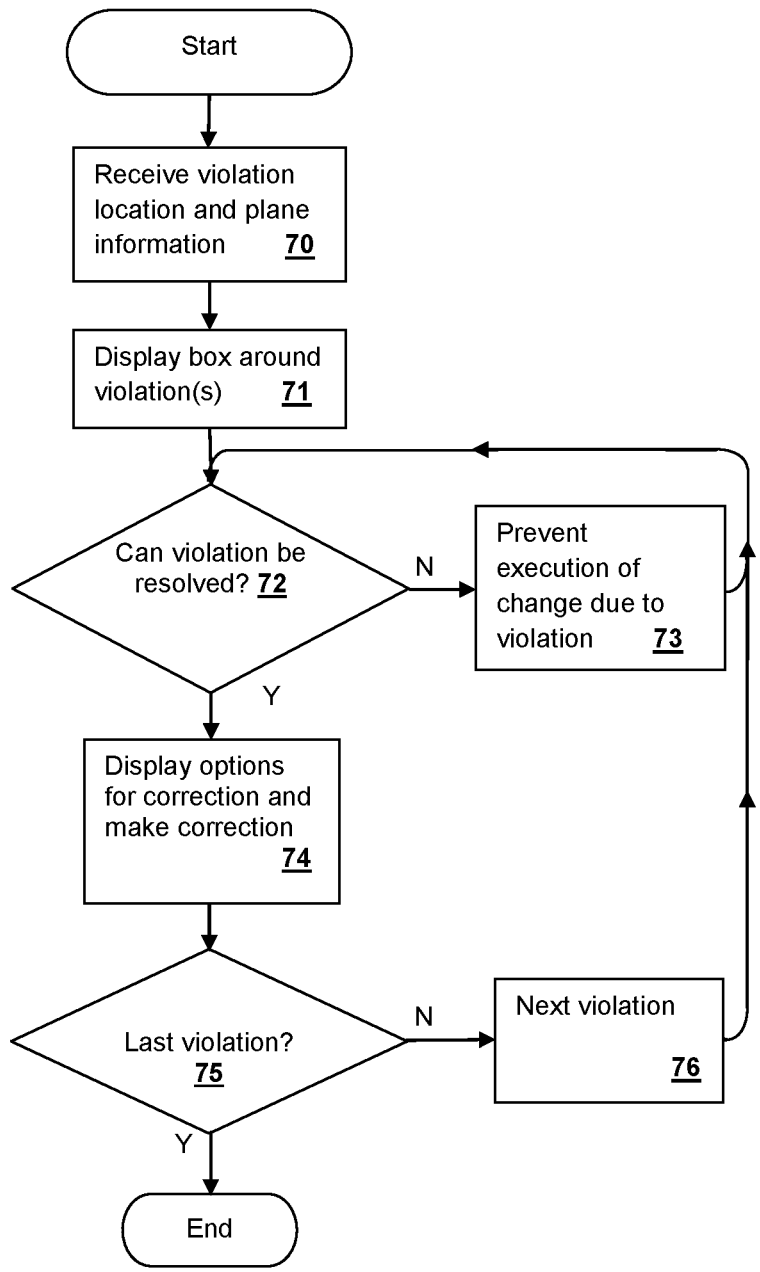
FIG. 6 is a flow chart depicting a further process within the method of FIG. 5.

Referring now to FIG. 6, the reference plane solution processes invoked in step 68 of FIG. 5 is illustrated in accordance with an example embodiment. First the violation location and reference plane information are received (step 70) and a box is displayed around the violation(s) (step 71). A check is performed to determine whether the violation can be resolved (decision 72), e.g., by extending an adjacent reference plane. If the violation cannot be resolved (decision 72), the change is prevented/undone (step 73) If the violation can be resolved (decision 72), options are presented to the PCB designer for correction and the correction is made (step 74). Until the last violation has been processed (decision 75), the next violation is checked (step 76) and steps 72-75 are repeated to complete the reference plane solution.

Figure 7:
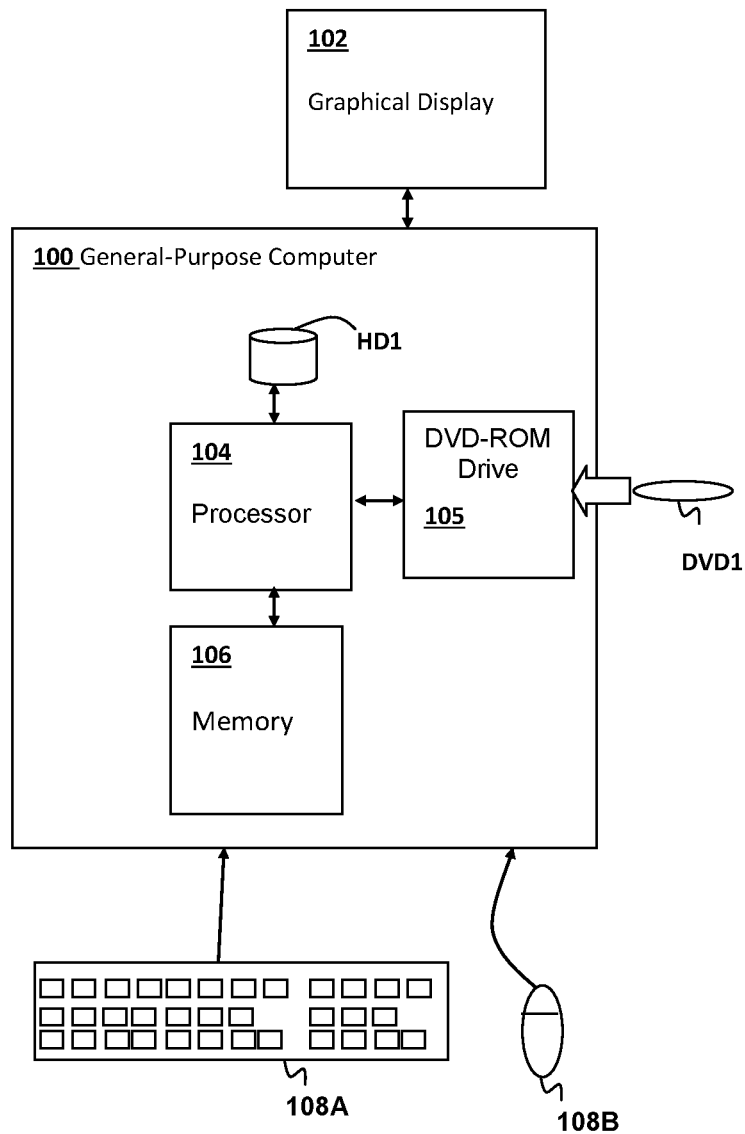
FIG. 7 is a block diagram illustrating a computer system that executes program code according to an embodiment of the disclosure implementing a method according to an embodiment of the invention.

Referring now to FIG. 7, a computer system in which the above-described computer-performed methods are performed, is shown. A general-purpose computer 100 is coupled to a graphical display 102 for display of PCB designs, as well as user interface screens for controlling one or more programs including programs forming computer program products including program instructions for carrying out the methods described above. Input devices such as a keyboard 108A and a mouse 108B provide for user interaction with general-purpose computer 100. General-purpose computer 100 includes a processor 104 for executing program instructions stored in a memory 106 including program instructions forming the above-described computer program products in accordance with embodiments of the invention. A removable storage device, such as a DVD-ROM drive 105 is included for accepting storage media such as DVD-ROM DVD1 forming a computer program product in accordance with an embodiment of the invention. The computer system depicted in FIG. 7 is only one example of a computer system such as a desktop computer system or a notebook computer system that can be used to perform the PCB layout and design processing described above. Other types of computer systems, including distributed and networked computer systems in which some or all of the algorithms and portions thereof are executed remotely are within the scope of the embodiments of the invention as contemplated herein, and the system depicted in FIG. 7 should not be construed as limiting the type of computer system or computer program products that form embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method of interacting with a printed circuit board designer using a workstation computer system modifying a controlled-impedance printed circuit board design comprising a plurality of vertically-stacked layers, the computer-performed method comprising:

the workstation computer system loading the controlled-impedance printed circuit board design;

the workstation computer system receiving a first user input from the printed circuit board designer directing modification of the controlled-impedance printed circuit board design by moving features of a first one of the plurality of vertically-stacked layers of the controlled-impedance printed circuit board design to a second one of the plurality of vertically-stacked layers;

first displaying by the workstation computer system a first graphical representation of the controlled-impedance printed circuit board design;

automatically, in response to receiving the first user input, the workstation computer system computing modified widths of circuit traces of a first layer of the controlled-impedance printed circuit board design according to an impedance control value of the controlled-impedance printed circuit board design and according to a new position of the circuit traces caused by a movement of the features of the first one of the plurality of vertically-stacked layers to the second one of the plurality of vertically-stacked layers and storing the modified widths of the circuit traces of the first layer of the controlled-impedance printed circuit board design in a representation of a second layer of the controlled-impedance printed circuit board design;

automatically, in response to the first user input, detecting whether or not the first user input from the printed circuit board designer directs movement of the features such that a critical signal is missing coverage by a corresponding reference on an adjacent plane;

generating a modified graphical representation of the controlled-impedance printed circuit board design according to the movement of the features of the first one of the plurality of vertically-stacked layers to the second one of the plurality of vertically-stacked layers;

in response to detecting that the first user input directs movement of the features such that a critical signal is missing coverage by a corresponding reference on the adjacent plane, displaying a warning to the printed circuit board designer identifying the critical signal and a location of the missing coverage; and second displaying by the workstation computer system a second graphical representation of the controlled-impedance printed circuit board design.

2. The computer-performed method of claim 1, wherein the first user input directs modification of the controlled-impedance printed circuit board design by swapping two entire layers of the controlled-impedance printed circuit board design.

3. The computer-performed method of claim 1, wherein the first user input directs modification of the controlled-impedance printed circuit board design by moving the features within a region of the first layer of the controlled-impedance printed circuit board design to a second region within the second layer of the controlled-impedance printed circuit board design.

4. The computer-performed method of claim 1, further comprising:
responsive to computing modified widths of the circuit traces of the first layer of the controlled-impedance printed circuit board design, performing a design rules check on the new position of the circuit traces to determine whether or not the movement of the features of the first one of the plurality of vertically-stacked layers to the second one of the plurality of vertically-stacked layers causes a violation of design rules of the controlled-impedance printed circuit board design;
responsive to the design rules check determining that the movement of the features causes a violation of the design rules, indicating the violation to the printed circuit board designer; and
responsive to the design rules check determining that the movement of the features does not cause a violation of the design rules, performing the generating and the second displaying.

5. The computer-performed method of claim 1, wherein the detecting further comprises:
automatically, in response to the first user input, detecting that the critical signal has an extension beyond an end of the corresponding reference in the adjacent plane; and
responsive to detecting that the critical signal has an extension beyond an end of the corresponding reference in the adjacent plane, comparing a length of the extension to a stub length maximum associated with the critical signal, and wherein the displaying a warning displays a stub length violation warning.

6. The computer-performed method of claim 1, wherein the detecting further comprises automatically, in response to the first user input, detecting that a change in a signal reference occurs due to a critical signal crossing a change in reference planes in an adjacent layer, and wherein the displaying a warning displays a warning that a reference split has been introduced by the first user input.

7. A computer system comprising a processor for executing program instructions coupled to a memory for storing the program instructions, wherein the program instructions are program instructions for interacting with a printed circuit board designer using a workstation computer system modifying a controlled-impedance printed circuit board design comprising a plurality of vertically-stacked layers, wherein the program instructions comprise program instructions for:
the workstation computer system loading the controlled-impedance printed circuit board design;
the workstation computer system receiving a first user input from the printed circuit board designer directing modification of the controlled-impedance printed circuit board design by moving features of a first one of the plurality of vertically-stacked layers of the controlled-impedance printed circuit board design to a second one of the plurality of vertically-stacked layers;
first displaying by the workstation computer system a first graphical representation of the controlled-impedance printed circuit board design;
automatically, in response to receiving the first user input, the workstation computer system computing modified widths of circuit traces of a first layer of the controlled-impedance printed circuit board design according to an impedance control value of the controlled-impedance printed circuit board design and according to a new position of the circuit traces caused by a movement of the features of the first one of the plurality of vertically-stacked layers to the second one of the plurality of vertically-stacked layers and storing the modified widths of the circuit traces of the first layer of the controlled-impedance printed circuit board design in a representation of a second layer of the controlled-impedance printed circuit board design;
automatically, in response to the first user input, detecting whether or not the first user input from the printed circuit board designer directs movement of the features such that a critical signal is missing coverage by a corresponding reference on an adjacent plane;
generating a modified graphical representation of the controlled-impedance printed circuit board design according to the movement of the features of the first one of the plurality of vertically-stacked layers to the second one of the plurality of vertically-stacked layers;
in response to detecting that the first user input directs movement of the features such that a critical signal is missing coverage by a corresponding reference on the adjacent plane, displaying a warning to the printed circuit board designer identifying the critical signal and a location of the missing coverage; and
second displaying by the workstation computer system a second graphical representation of the controlled-impedance printed circuit board design.

8. The computer system of claim 7, wherein the first user input directs modification of the controlled-impedance printed circuit board design by swapping two entire layers of the controlled-impedance printed circuit board design.

9. The computer system of claim 7, wherein the first user input directs modification of the controlled-impedance printed circuit board design by moving the features within a region of the first layer of the controlled-impedance printed circuit board design to a second region within the second layer of the controlled-impedance printed circuit board design.

10. The computer system of claim 7, further comprising:
responsive to computing modified widths of the circuit traces of the first layer of the controlled-impedance printed circuit board design, performing a design rules check on the new position of the circuit traces to determine whether or not the movement of the features of the first one of the plurality of vertically-stacked layers to the second one of the plurality of vertically-stacked layers causes a violation of design rules of the controlled-impedance printed circuit board design;

responsive to the design rules check determining that the movement of the features causes a violation of the design rules, indicating the violation to the printed circuit board designer; and responsive to the design rules check determining that the movement of the features does not cause a violation of the design rules, performing the generating and the second displaying.

11. The computer system of claim 7, wherein the detecting further comprises:

automatically, in response to the first user input, detecting that the critical signal has an extension beyond an end of the corresponding reference in the adjacent plane; and responsive to detecting that the critical signal has an extension beyond an end of the corresponding reference in the adjacent plane, comparing a length of the extension to a stub length maximum associated with the critical signal, and wherein the displaying a warning displays a stub length violation warning.

12. The computer system of claim 7, wherein the detecting further comprises automatically, in response to the first user input, detecting that a change in a signal reference occurs due to a critical signal crossing a change in reference planes in an adjacent layer, and wherein the displaying a warning displays a warning that a reference split has been introduced by the first user input.

13. A computer program product comprising a computer-readable storage medium storing program instructions for execution by a general-purpose computer system, wherein the program instructions are program instructions for interacting with a printed circuit board designer using a workstation computer system modifying a controlled-impedance printed circuit board design comprising a plurality of vertically-stacked layers, wherein the program instructions comprise program instructions for:

the workstation computer system loading the controlled-impedance printed circuit board design;

the workstation computer system receiving a first user input from the printed circuit board designer directing modification of the controlled-impedance printed circuit board design by moving features of a first one of the plurality of vertically-stacked layers of the controlled-impedance printed circuit board design to a second one of the plurality of vertically-stacked layers;

first displaying by the workstation computer system a first graphical representation of the controlled-impedance printed circuit board design;

automatically, in response to receiving the first user input, the workstation computer system computing modified widths of circuit traces of a first layer of the controlled-impedance printed circuit board design according to an impedance control value of the controlled-impedance printed circuit board design and according to a new position of the circuit traces caused by a movement of the features of the first one of the plurality of vertically-stacked layers to the second one of the plurality of vertically-stacked layers and storing the modified widths of the circuit traces of the first layer of the controlled-impedance printed circuit board design in a representation of a second layer of the controlled-impedance printed circuit board design;

automatically, in response to the first user input, detecting whether or not the first user input from the printed circuit board designer directs movement of the features such that a critical signal is missing coverage by a corresponding reference on an adjacent plane;

generating a modified graphical representation of the controlled-impedance printed circuit board design according to the movement of the features of the first one of the plurality of vertically-stacked layers to the second one of the plurality of vertically-stacked layers;

in response to detecting that the first user input directs movement of the features such that a critical signal is missing coverage by a corresponding reference on the adjacent plane, displaying a warning to the printed circuit board designer identifying the critical signal and a location of the missing coverage; and second displaying by the workstation computer system a second graphical representation of the controlled-impedance printed circuit board design.

14. The computer program product of claim 13, wherein the first user input directs modification of the controlled-impedance printed circuit board design by swapping two entire layers of the controlled-impedance printed circuit board design.

15. The computer program product of claim 13, wherein the first user input directs modification of the controlled-impedance printed circuit board design by moving the features within a region of the first layer of the controlled-impedance printed circuit board design to a second region within the second layer of the controlled-impedance printed circuit board design.

16. The computer program product of claim 13, further comprising:

responsive to computing modified widths of the circuit traces of the first layer of the controlled-impedance printed circuit board design, performing a design rules check on the new position of the circuit traces to determine whether or not the movement of the features of the first one of the plurality of vertically-stacked layers to the second one of the plurality of vertically-stacked layers causes a violation of design rules of the controlled-impedance printed circuit board design;

responsive to the design rules check determining that the movement of the features causes a violation of the design rules, indicating the violation to the printed circuit board designer; and responsive to the design rules check determining that the movement of the features does not cause a violation of the design rules, performing the generating and the second displaying.

17. The computer program product of claim 13, wherein the detecting further comprises automatically, in response to the first user input, detecting that a change in a signal reference occurs due to a critical signal crossing a change in reference planes in an adjacent layer, and wherein the displaying a warning displays a warning that a reference split has been introduced by the first user input.

18. The computer program product of claim 13, wherein the detecting further comprises:

automatically, in response to the first user input, detecting that the critical signal has an extension beyond an end of the corresponding reference in the adjacent plane; and responsive to detecting that the critical signal has an extension beyond an end of the corresponding reference in the adjacent plane, comparing a length of the extension to a stub length maximum associated with the critical signal, and wherein the displaying a warning displays a stub length violation warning.

* * * * *